3,407,137
REMOVAL OF SURFACE ACTIVE AGENTS
FROM HYDROCARBONS AND THE LIKE
USING CHRYSOTILE ASBESTOS FIBERS
Thomas Harry Sadler, Middlesex, N.J., assignor to Johns-Manville Corporation, New York, N.Y., a corporation of New York
No Drawing. Filed Aug. 12, 1965, Ser. No. 479,345
2 Claims. (Cl. 208—300)

ABSTRACT OF THE DISCLOSURE

Chrysotile asbestos fibers are employed for treating liquid hydrocarbons to remove liquid surfactants, such as sulfonates which are present in amounts of 1–100 p.p.m. Fibers having a surface area of 1000 to 30,000 cm.$^2$/g. of fibers are used in amounts of 50–12,000 parts per million by mixing with the hydrocarbon and then are removed by settling or filtering.

---

This invention relates to the use of chrysotile asbestos fiber and fiber products for removing surface active agents from hydrocarbon products.

Various surface active agents are used as emulsion breakers, coagulants, and corrosion inhibitors many times between the crude production and final product use of hydrocarbons as lubricants, fuels, and chemical raw materials. These surfactants are undesirably retained in the hydrocarbons even after distillation and other processes, including filtration, which removes nearly all other unwanted substances and contaminants. It is recognized that even small quantities of surfactants greatly lower the interfacial tensions between oil and water, thus allowing water, and particulate matter such as rust, to pass through filters and cause either a sludge or residue once the hydrocarbon has been exhausted in end usage.

Different materials have been used in an attempt to remove surfactant agents from hydrocarbons, and among the most successful have been the attapulgus clays. These clays have been successful in many instances, but have on some occasions failed to satisfy the high demands of the industrial processes and end uses.

It is therefore a principal object of this invention to provide a new technique for removing surface active agents from hydrocarbons.

It is another object of this invention to provide a composition of matter capable of being used in the purification of hydrocarbons, and specifically, to remove surface active agents therefrom.

Other objects and further applicability of this invention will become apparent from the disclosure hereinafter.

It has been discovered that the foregoing objects may be satisfied and the disadvantages of the prior processes and compositions overcome by treating the hydrocarbon with a specific class of asbestos fibers. More particularly, it has been determined that chrysotile asbestos fiber or fiber products may be employed to treat hydrocarbons whereby the surfactants are removed and the interfacial tensions of the hydrocarbons raised to level approaching the pure hydrocarbons which allow for proper filtration and water removal on conventional filter coalescers. Although there are many ways in which the contaminated hydrocarbon may be allowed to contact the fiber, including the use of fibers in a slurry, and the use of a fiber paper as a filter sheet, the incorporation of the fibers in conventional glass fiber filter tubes, the instant invention is best demonstrated by a method which simply involves mixing a particular class of fibers and hydrocarbons for a short period, after which the fibers may be removed either by settling or filtering. In a conventional commercial operation, the fiber products may be added just prior to filtering the hydrocarbon material in a filter coalescer.

Generally speaking, the amount of surfactant impurity present in the hydrocarbon ranges between 1 and 100 p.p.m. and usually about 10 p.p.m. Under most circumstances it is highly desirable to reduce the surfactant concentration to less than 1 p.p.m. The amount of asbestos fiber necessary to reduce the surfactant concentration is dependent upon the initial concentration and desired final concentration of the surfactant and the type fiber employed as well as the physical properties of the chrysotile asbestos fiber used. That is, it has been determined that surfactant removal is dependent upon the particle size and therefore, the surface area of fiber used and the origin of the specific asbestos product. This is demonstrated in the following table.

TABLE 1

| Chrysotile Fiber | Surface area, cm.$^2$/gm. | Mg surfactant [1] removed per gm. of solid |
| --- | --- | --- |
| Coalinga Fiber A | 8,400 | 19.0–19.2 |
| Coalinga Fiber B | 2,800 | 2.5–2.8 |
| Jeffrey Fiber A | 20,700 | 12.0–12.5 |
| Jeffrey Fiber B | 14,000 | 9.3–9.8 |

[1] ACTO 632 a sulfonate surfactant marketed by the Standard Oil Company of New Jersey.

The table illustrates that the surfactant removal capacity is dependent upon the origin of the asbestos fiber used as well as particle size. That is to say, it is thought that some chrysotile fiber products contain certain serpentine type materials which do not function as efficiently in this application as other fiber products. Accordingly, as demonstrated in the table, the Coalinga chrysotile fiber has a degree of efficiency greater than that of the Jeffrey fiber. The chrysotile fibers are therefore used at a proper particle size and surface area, but it should be recognized that different amounts might be necessary in order to effect the same removal dependent upon the particular source.

Although a single oil soluble anionic surface active agent was used for the data below, it is understood that other surface active agents and other hydrocarbons could have been treated without changing the spirit of the invention.

The following data, Table 2, demonstrates the effect of chrysotile type fiber products in removing an oil soluble surface active agent: G-3300-Sulfonate surfactant marketed by Atlas Chemical Industries from filtered kerosene. The interfacial tensions were determined by the DuNouy Tensiometer, according to ASTM Test D 1331–56.

TABLE 2

Interfacial tension dyne-cm.

Non-treated control sample—
    Distilled water and kerosene _____ 31
Distilled water and contaminated [1] (100 p.p.m.)
    kerosene _____ 4.5
Distilled water and contaminated [1] (100 p.p.m.)
    kerosene after mixing 1 gm. of asbestos fiber in
    100 mil of the contaminated kerosene.
Amosite fiber _____ 18.5
Anthophyllite fiber _____ 15.5
Chrysotile fiber—Coalinga Fiber A _____ 30+
Chrysotile fiber—Coalinga Fiber D _____ 30+
Chrysotile fiber—Jeffrey Fiber B _____ 30+

[1] G–3300.

From the above data, it can be seen that the chrysotile fiber demonstrates a superiority over other types of asbestos fiber for removal of surfactants from hydrocarbon. It has previously been demonstrated that the origin of the asbestos fiber and the surface area of the fiber are important factors. It is preferred that between 1,000 and 30,000 cm.²/g. surface area be used, with the greatest preference being between 1,000 and 10,000. It should be understood that for the most effective surfactant removal, the higher the surface area, the better the treatment. However, with the higher surface area, the particle size is reduced to such an extent that the filterability rate of the hydrocarbon is below practical considerations.

An evaluation was made of various types of asbestos fiber and attapulgus clays to determine their effectiveness in removing surfactants from various hydrocarbons. The technique used for the analysis is set forth in "Surfactants in Jet Fuels," by J. A. Bert and H. R. Porter, pp. 6 and 7, from a paper presented at the 28th meeting of the American Petroleum Institute's Division of Refining, May 13, 1963. The spectrophotometric procedure described was modified slightly and the test was performed using the kerosene as a standard and as solutions made by dissolving 0.4 g. of surfactant in four liters of filtered kerosene.

The kerosene standard was analyzed by placing a standard chloroform kerosene solution in a 300 ml. Erlenmeyer flask. Thirty ml. of alcoholic sodium hydroxide was added. The flask was stoppered and shaken for ten minutes. The mixture was transferred to a 500 ml. separatory funnel which allowed the phases to separate completely. The bottom phase was transferred to a clean 300 ml. Erlenmeyer flask, to which was added 15 ml. of chloroform and 25 ml. of reagent No. 2 methylene blue. The flask was stoppered and shaken for five minutes. The chloroform was allowed to settle completely, and 1 ml. of the chloroform layer colored blue was transferred to a 50 ml. volumetry flask and was filled to the mark using chemical pure chloroform. The colors were evaluated against the reagent blank using a Beckman DU spectrophotometer at 665 microns $LR=1$, Slit=0.01 mm., red phototube, 10 mm. cell path and a sensitivity on power supply equal to 2.

The contaminated kerosene samples were tested by placing 1.0 gram of a fiber sample in duplicate of each of the tested materials used in a 300 ml. Erlenmeyer flask and adding 250 ml. of the kerosene containing 0.25 g. of Acto 632 sulfonate surfactant. The flask was stoppered and shaken for five minutes, removed and filtered immediately, using a vacuum and the No. 40 Whatman filter paper. One hundred ml. of the clear filtrate was transferred to a clean 300 ml. flask, to which was added 30 ml. of alcoholic sodium hydroxide and the procedure was followed as in the analysis of the kerosene standard. The results of the analysis are set forth in Table 3.

TABLE 3

| Sample analyzed | Mg. surfactant removed per gm. of solid used |
|---|---|
| Coalinga Fiber A (Nonpulverized)—Sample 1 | 19.0 |
| Sample 1 Duplicate | 19.2 |
| Coalinga Fiber C (Pulverized)—Sample 2 | 19.8 |
| Sample 2 Duplicate | 19.9 |
| Jeffrey Fiber B (Nonpulverized)—Sample 1 | 9.3 |
| Sample 1 Duplicate | 9.8 |
| Jeffrey Fiber A (Pulverized)—Sample 2 | 12.0 |
| Sample 2 Duplicate | 12.5 |
| Attapulgus clay (30/60 mesh)—Sample 1 | 4.5 |
| Sample 1 Duplicate | 5.0 |
| Attapulgus clay (200 up mesh)—Sample 2 | 19.8 |
| Sample 2 Duplicate | 19.7 |

In view of the above range of mg. of surfactant removed per gram of fiber which is representative of the range for chrysotile fiber, it requires between 50 and 12,000 p.p.m. of fiber for between 1 and 100 p.p.m. of surfactant and practically between 50 and 1200 p.p.m. for the normal concentration of surfactant, i.e., between 1 and 10 p.p.m.

It is believed the above provides a complete description of the invention in such manner as to distinguish it from other inventions and from what is old, and provides a description of the best mode contemplated of carrying out the invention and thereby complies with the patent statutes.

It is to be understood that variations and modifications of the invention, as illustrated by specific examples herein, may be made without departing from the spirit of the invention. It is also to be understood that the scope of the invention is not to be interpreted as limited to the specific embodiments disclosed herein, but only in accordance with the appended claims, when read in the light of the foregoing description.

What I claim is:
1. A process for removing liquid surfactants from liquid hydrocarbon comprising the steps of:
   (a) contacting such liquid hydrocarbon with chrysotile asbestos fibers, the amount of fibers used being in the range of about 50 to 12,000 parts per million, and the surface area of the asbestos fiber being in the range of about 1000 to 30,000 sq. cm. per gram of fiber, the fibers acting to attract the liquid surfactant thereto, and
   (b) separating the fibers from the liquid hydrocarbon, whereby liquid surfactants remain in contact with the fibers and are thus removed from the liquid hydrocarbon.

2. A process for removing liquid surfactants from liquid hydrocarbon as recited in claim 1, wherein the liquid hydrocarbon contains liquid surfactants in the amount of about 1 to 100 parts per million.

References Cited

UNITED STATES PATENTS

| 1,884,587 | 10/1932 | Darlington | 208—302 |
| 1,603,174 | 10/1926 | Weir | 208—303 |
| 2,549,732 | 4/1951 | Weaver | 252—449 |

OTHER REFERENCES

Dictionary of Applied Chemistry, Thorpe, vol. I (1921), pp. 395 and 396.

DELBERT E. GANTZ, *Primary Examiner.*

G. J. CRASANAKIS, *Assistant Examiner.*